W. R. FOX AND A. A. RIDDELL.
FLEXIBLE SHAFT COUPLING.
APPLICATION FILED DEC. 10, 1919.
Patented June 28, 1921.
Fig. 1.
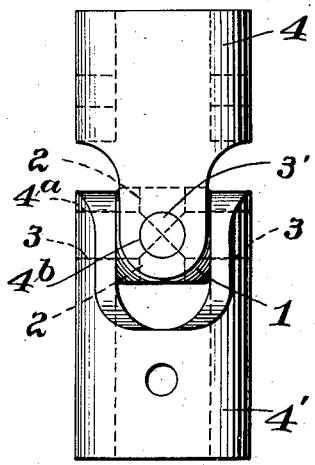
Fig. 3.
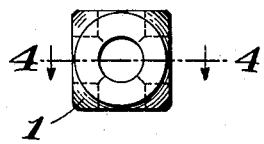
Fig. 2.
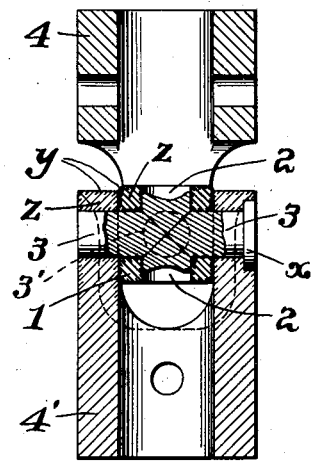
Fig. 4.
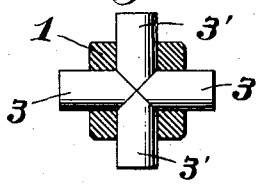
Fig. 5.
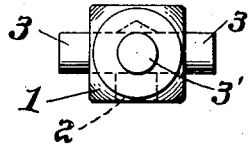
Fig. 8.
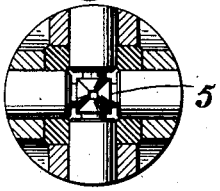
Fig. 6.
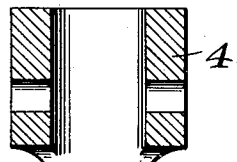
Fig. 5b.
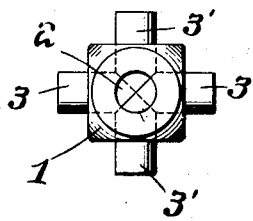
Fig. 7.
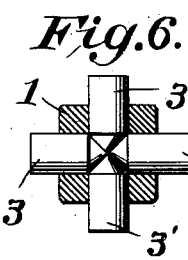
Fig. 6b.
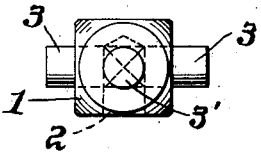
Fig. 5a.
Fig. 6a.
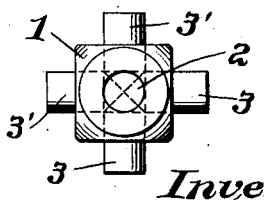
Inventors:
William R. Fox,
Austin A. Riddell,
by Spear, Middleton, Donaldson & Hall
Attys.

W. R. FOX AND A. A. RIDDELL.
FLEXIBLE SHAFT COUPLING.
APPLICATION FILED DEC. 10, 1919.

1,382,720.

Patented June 28, 1921.
2 SHEETS—SHEET 2.

Inventors:
William R. Fox,
Austin A. Riddell,
by Spear, Middleton, Donaldson & Hall
Attys.

UNITED STATES PATENT OFFICE.

WILLIAM R. FOX AND AUSTIN A. RIDDELL, OF JACKSON, MICHIGAN; SAID RIDDELL ASSIGNOR TO SAID FOX.

FLEXIBLE SHAFT-COUPLING.

1,382,720.   Specification of Letters Patent.   Patented June 28, 1921.

Application filed December 10, 1919. Serial No. 343,771.

*To all whom it may concern:*

Be it known that we, WILLIAM R. FOX and AUSTIN A. RIDDELL, citizens of the United States, and residents of Jackson, Michigan, have invented certain new and useful Improvements in Flexible Shaft-Couplings, of which the following is a specification.

The invention relates to that type of flexible shaft coupling in which a pair of forks are connected to a central block by pins which form the pivots about which the forks move, these forks being arranged a quarter turn relative to each other. In this type of joint, where the pins are inserted into or through the block, and screws or other means are employed to hold the parts together, or where each fork or the block is made in sections, an objection exists because of the liability of the pins or other members to work loose, due to stresses and wear, resulting in imperfect transmission of power, or eventually to disruption of the shaft.

One object of the invention is to provide a coupling in which the parts, *i. e.*, the block, pivot pins and fork, will be connected in a manner to permit them to function perfectly in assuming the necessary different relative positions, but the connection will be such that the parts will not work out of place or work loose and detach one from the other, because they are permanently attached in the sense that while they can have the necessary relative movement, they are so assembled and interlocked that only by direct breakage can they be separated. They cannot work apart and drop away the one from the other.

Other objects of the invention will appear hereinafter.

In the accompanying drawings:

Figure 1 is a side view of a joint embodying certain features of my invention.

Fig. 2 is a longitudinal sectional view of Fig. 1 but with the pins united to each other and to the block by welding or brazing.

Fig. 3 is a view of the center block detached.

Fig. 4 is a sectional view of the block on line 4—4 of Fig. 3.

Fig. 5 is a sectional view through the block with the pivot pins assembled therewith, these pins having mitered inner ends as in Figs. 1 and 2.

Fig. 5$^a$ a side view looking from the same direction as in Fig. 5.

Fig. 5$^b$ is a plan view of Fig. 5$^a$.

Figs. 6, 6$^a$ and 6$^b$ are views similar to Figs. 5·5$^a$ 5$^b$ but with pins whose inner contacting ends instead of being mitered to fit together are of conical shape.

Fig. 7 is a view of a modification showing shouldered pins.

Fig. 8 is a cross section of Fig. 7.

Figure 9:
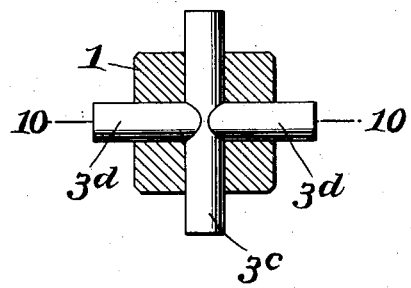

Fig. 9 is a view of a modification in which one long pin and two short pins are employed instead of four pins.

Figure 10:
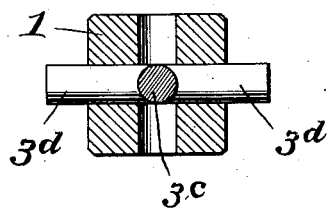

Fig. 10 is a cross section of Fig. 9, substantially on line 10—10 of Fig. 9 the short pins being shown in elevation.

Figure 11:
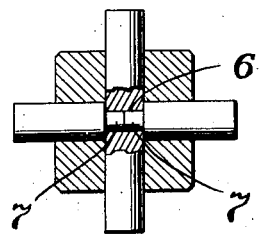

Fig. 11 is a view of another modification in which three pins interlock and are self centering.

The center block 1 is formed in one piece with a cylindrical opening 2 running all the way, or only part way, through it, and with axially alined openings 3$^a$ to receive the pair of pins 3 and other axially alined openings as 3$^b$, to receive the pins 3' which are arranged in a plane at right angles to the plane in which the pins 3 lie. These pins meet at their inner ends and substantial contact is afforded by forming these inner ends mitered as in Figs. 5, to 5$^b$ or conical as in Figs. 6 to 6$^b$. The pins are solid pieces. The forks 4, 4' are of one piece each. In assembling the parts the forks are placed in position a quarter turn relatively to each other, with their openings 4$^a$ and 4$^b$ in axial alinement with the proper pair of openings in the block and then the pins 3, 3' are inserted through the fork arms and into the block with their inner ends meeting at the center of the block, and then by brazing or electric welding these inner ends together and to the block, the pins become in effect integral parts of the block and as the fork arms are on the outer projecting ends of these pins, the parts of the coupling are permanently held together, though relative movement of the forks is allowed. For electric welding or brazing together the inner ends of the pins and brazing or welding them to the block, access thereto is afforded by the central opening 2 of the block and also through the hollow center of the fork members.

It will be seen from the above that the parts are permanently connected together, no screws or other members being employed which will wear loose and drop out.

It will be noticed that with the improved construction above set forth, the forks can be exact duplicates of each other and all of the pins can be of the same size. This contributes to quantity production because the same pin can be assembled in any one of the openings in the block and the forks can be assembled with the block in either of the two possible positions without special attention or selection on the part of the workman.

It is important that the rubbing surfaces of the block, forks and pins be hard and smooth. By the present improvement it is possible to harden the parts after they are put together so that hard contacting surfaces are provided.

The parts may be made of tool steel. After the brazing or welding of the pins and center block, the coupling is raised to the proper temperature and then cooled which hardens them and then the temper is drawn to the proper point for working. The same result can be obtained by using low carbon steel as the parts have been properly machined and pack hardened which carbonizes them, and as they are welded or brazed they can be raised to the proper temperature and then cooled, which will harden the surfaces where they come in contact, the pins with the work and the block with the fork. In the drawing, the hard working surface is indicated at $y$ and the soft center at $z$.

If desired the pins may be headed as shown at $x$ and the fork arms can be formed each with a countersunk recess to receive the heads of the pins. In the twisting action of a universal joint long use will produce such wear that the forks will have a tendency to spread, but this will be overcome by the pins connected together and to the block at their inner ends and having the heads overlying parts of the fork arms.

While the brazing or welding, as carried out in accordance with the preceding description, results in connecting the inner ends of the pins to each other and also to the block it is conceivable that the pins may be welded to the block at their inner ends and not to each other or they may be welded to each other without reference to the degree of weld to the block, if any, but the welding of the pins, both to each other and to the block, makes a strong integral construction, which may be carried out with the simplest form of procedure, and this is preferred.

Figs. 7 and 8 show the pins provided with shoulders 5. These are shown in these views in their original condition, that is, before they are brazed together. The shoulders will add to the security of the fastening when the brazing is done, the metal flowing into the space around the neck of the pin above the shoulder and forming substantially an integral locking connection at this point.

The parts of the coupling can be hardened at the time of welding or brazing or at a separate operation.

In the brazing or welding operation one fork member may be turned aside at right angles to the other to expose the center block for placing the tool or electrode. In brazing, the torch will heat up the center block and the pins and when they have reached the proper temperature, the borax and brass, or bronze, is introduced and the brazing thus completed.

Both sides of the center block may be brought under the brazing torch or electric arc so as to insure a more positive uniting of the parts. For brazing one side of the block may have the hole leading to the center while the other side may be left intact, i. e. without an opening.

The brazing may be done by heating to the proper degree in a furnace, having previously introduced the brazing compound into the open side of the block.

In Figs. 9 and 10 I show a modification of the pin arrangement in which a long pin $3^c$ is used and two short pins $3^d$, the inner ends of which bear on the long pin to be brazed or welded in place.

In Fig. 11 another modification is shown in which the long pin has sockets or openings 6 to receive dowels 7 on the short pins which can be brazed.

This will facilitate the quick and accurate assembly of the pins, because only three pins need be handled instead of four, and furthermore the dowel and sockets definitely determine the relative position of the pins to each other. When one of the short pins finds its socket in the long pins these two members are in their desired positions with their ends projecting beyond the center block to afford proper pivot bearings for the forks, and of course the other short pin will be accurately positioned merely by inserting it. The above advantage is also present in Figs. 7 and 8.

This self centering feature is also present in the forms of Figs. 5 and 6 where the four pins are specially formed at their inner ends to have self determination as to their positions.

If the four pins were cut off square they would not center themselves nor would they readily maintain their relative positions if once centered. These pins may be said to be interengaged because the end of one, where four are used, fits in the space or recess formed between the ends of two others, or where three are used the ends of two fit in the recesses formed in the long pin.

It will be understood that where in the appended claims I refer to the pins as being fastened by brazing at their inner ends this language is to be construed in a general sense applicable to both forms of the invention whether there be three pins or four. In the case of the single long pin this in one aspect is two pins combined with their inner ends united to each other and to the other pins, one outer end forming one pivot and the other outer end the other pivot.

One broad feature of the invention is the assembly of the two members, i. e. the one piece forks and the center block in proper relative positions with their pivot openings in alinement, then inserting the pivot pins and then welding or brazing the pins to one of the said members.

In carrying out the invention in the specific way described the brazing or welding action takes place upon all of the pins at once at their inner portions exposed within the block. If the pins were welded to the forks after being inserted four separate welds or brazing points would exist, one at the outer portion of each pin where it rests in the fork, but despite this the latter way would be within the purview of my invention.

I claim:

1. In combination, the members, i. e. the one piece forks and the center block, pins welded or brazed to one of said members and extending into and turning in the other of said members.

2. A flexible shaft coupling comprising a block, pins having their inner ends welded or brazed together within the block, and forks pivoted on the pins, substantially as described.

3. A flexible shaft coupling comprising a block, pins set therein and welded or brazed thereto at their inner ends within the block and forks pivoted on the pins.

4. A flexible shaft coupling comprising a block, pins set therein and welded or brazed to each other and to the block at their inner ends within the block, and forks pivoted on the pins, substantially as described.

5. In combination a hollow block having pins extending through its wall and exposed at their inner ends within the block for being fastened by welding or brazing and forks pivotally mounted on the pins.

6. In combination a block having pins inserted through its wall and welded through the open end of the block, and forks pivoted on the pins, substantially as described.

7. In combination a block, pins set therein and having their inner ends tapered or mitered and in contact and forks pivoted on the pins, said pins at their inner ends being welded or brazed, substantially as described.

8. In combination a center block, forks, and pins inserted through the forks into the block and having self positioning or centering formations at their inner contacting portions, said pins being held by brazing or welding at their inner ends within the block.

9. In combination a center block, forks embracing the same, and pins inserted through the forks into the block and having interengaging formations at their adjacent inner portions whereby they are self positioning, said pins being held by brazing or welding at their inner ends.

10. In combination, a center block, forks embracing the same, four pins inserted through the forks into the block and having inter-engaging formations at their adjacent inner ends whereby they are self positioning, said pins being held by brazing or welding to one of the members, forks or center block, and turning in the other member, substantially as described.

11. A flexible shaft coupling comprising a block, one piece forks embracing the block and pins of like diameter inserted in the forks and block and held at their inner ends by brazing or welding within the block, substantially as described.

12. In a shaft coupling, the combination of a hollow block, pins furnishing pivots for forks having shouldered ends within the blocks to provide means for receiving brazing metal to hold the pins in place.

13. In combination a block, a pair of forks, pins having heads at their outer ends bearing on the forks, said pins being welded or brazed at the center of the block, substantially as described.

14. The herein-described method consisting in placing the members, i. e. forks and center block in proper relation, then inserting the pivot pins through the forks into the block and then securing the pins to one of said members by brazing or welding.

15. The herein-described process of making a flexible coupling for shafting consisting in first positioning the forks in relation to the connecting block, then inserting the pivot pins into the block through the forks and then uniting the inner ends of the pins to the block, by welding or brazing, substantially as described.

16. The herein-described process of making a flexible coupling for shafting consisting in first positioning the forks in relation to the connecting block, then inserting the pivot pins into the block through the forks and then uniting the inner ends of the pins by welding or brazing, substantially as described.

17. The herein-described process of making a flexible coupling for shafting consisting in first positioning the forks in relation to the connecting block, then inserting the pivot pins into the block through the forks and then securing the inner ends of the pins by welding, and hardening the contacting surfaces of the fork and pins and fork and block after assembly of said parts, substantially as described.

18. The herein-described process consisting in placing the forks in relation to the connecting block, then inserting the pivot pins through the fork into the block and affixing in place by brazing or welding and then hardening the contacting wearing surfaces of the parts, substantially as described.

In testimony whereof, we affix our signatures.

WILLIAM R. FOX.
AUSTIN A. RIDDELL.